United States Patent Office 3,242,108
Patented Mar. 22, 1966

3,242,108
COMPOSITIONS FOR PRODUCING POLYURE-
THANE RESINS AND RESINOUS FOAMS
AND PRODUCTS PREPARED THEREFROM
Charles W. McGary, Jr., and Charles T. Patrick, Jr.,
South Charleston, W. Va., assignors to Union Carbide
Corporation, a corporation of New York
No Drawing. Filed Apr. 4, 1961, Ser. No. 100,514
17 Claims. (Cl. 260—2.5)

This invention relates to novel polymerizable, curable compositions of matter for producing polyurethanes; to polymerized and cured resinous products obtained therefrom and to methods of producing the same. This invention furthermore relates to novel foamable, polymerizable and curable compositions of matter for producing polyurethane foams; to foamed, polymerized and cured resinous products obtained therefrom and to methods of producing the same. More particularly this invention relates to novel polymerizable, curable epoxy-containing compositions for producing polyurethanes useful in the arts of coatings, castings, moldings, laminates, adhesives, foams and the like.

The novel compositions of this invention are directed to polymerizable, curable compositions comprising (a) monomeric polyepoxide; (b) an organic polyisocyanate or polyisothiocyanate; (c) boron trifluorideamine complex; and (d) an organic compound containing an active hydrogen atom such as, for example, alcohols (including phenols), carboxylic acids, polyester adducts derived from condensation of polyols and polycarboxylic acids or anhydrides, and the like. When foamable compositions are to be prepared a fifth essential ingredient is needed: (e) a suitable foaming agent, more fully defined below. The compositions of this inventon can also include various inorganic and organic inert fillers if desired. A particularly preferred filler is poly(vinyl chloride), the use of which imparts flame retardant properties to the polymerized and cured resins or resinous foam.

The curable compositions of this invention, both foamable and non-foamable, are extremely low viscosity liquids at temperatures ranging upwards from normal room temperature. Numerous advantages and objects can be attained by employment of the compositions of this invention. The compositions can be easily handled in such resin forming applications as coating, bonding, laminating, molding, casting, potting and the like, without the need of solvents or diluents although such solvents or diluents can be used if desired. In casting applications, these compositions can be made to fill small intricacies of molds without necessity for high pressures or high temperatures. In coating applications, they can be easily spread, brushed or sprayed on surfaces by the many techniques available to the paint, lacquer and varnish industries. These curable compositions undergo negligible shrinkage when cured and are particularly useful in bonding, casting, molding and potting applications where undue shrinkage is particularly undesirable. These compositions can be easily prepared using low temperatures at which no gelation occurs. However they can be cured and polymerized rapidly at higher temperatures. Because of the use of an active-hydrogen containing modifier as an essential ingredient of these compositions it is possible in many instances to polymerize and cure (and, alternatively, to foam) the compositions at ambient room temperature and in very short time periods to produce polyurethane resins having heat distortion temperatures as high as 150° centigrade or to produce polyurethane resin foams having excellent load bearing properties and rigidity even at elevated temperatures.

The unfilled, polymerized, cured and non-foamed resins of this invention are water resistant. They can be made as hard, rigid infusible products; as tough, flexible, infusible products or as products having intermediate degrees of hardness and rigidity or toughness and flexibility, as desired. They can be machined to desired shapes and configurations and can be polished if desired. As previously noted, these resins can also be made as products having very high heat distortion temperatures, on the order of 150° centigrade or higher; and are thus capable of sustaining heavy loads at high temperatures. Resins having combinations of any one or more of these useful properties can be produced.

In general, what has been said immediately above as to the non-foamed resins of this invention also is applicable in describing the polyurethane resin foams which can be prepared in accordance with the teachings herein. These foams can be cut, sawed, machined, polished, etc., similarly as the non-foam resins. As noted hereinabove foams can be prepared which have very high ultimate compressive strengths and which retain high stiffness even at temperatures of 140° centigrade or higher, and thus have excellent load bearing properties. Polyurethane foams having combinations of any one or more of the properties denoted above can be produced.

As previously noted this invention is directed to curable compositions comprising (a) monomeric poly-epoxide; (b) an organic isocyanate or isothiocyanate; (c) boron trifluoride-amine complex; and (d) an active-hydrogen containing organic compound. In the foamable composition modification of this invention a further ingredient (e) a suitable foaming agent is required. These ingredients and the proportions thereof in the novel compositions of this invention will now be more fully described.

Virtually any monomeric polyepoxide can be used, either singly or in combination, in preparing the novel curable or foamable, curable compositions of this invention. Preferred epoxides used in the practice of this invention are the cyclohexene oxide type epoxides and include the following:

(1) 3,4 - epoxycyclohexylmethyl - 3,4 - epoxycyclohexanecarboxylate and related diepoxides as described in U.S. Patent 2,716,123. Most particularly preferred epoxides within the group are 3,4-epoxycyclohexylmethyl - 3,4-epoxycyclohexanecarboxylate; 3,4 - epoxy - 1 - methycyclohexylmethyl - 3,4 - epoxy - 1 - methylcyclohexanecarboxylate; 3,4 - epoxy - 6 - methylcyclohexylmethyl - 3,4 - epoxy - 6 - methylcyclohexanecarboxylate; and 3,4 - epoxy - (3 and/or 4)methylcyclohexylmethyl-3,4-epoxy-(3 and/or 4)methylcyclohexanecarboxylate.

(2) Polyesters of 3,4-epoxycyclohexanecarboxylic acid and a polyol including etheric glycols such as, for example, diethylene glycol, triethylene glycol, dipropylene glycol and the like. Many of these polyesters are shown in U.S. 2,745,847. Polyols other than those mentioned in said patent, from which these polyesters can be prepared, include 2,2-diethyl-1,3-propanediol; 1,6-hexanediol; 3-methyl-1,5-pentanediol; 1,1,1-trimethylolpropane; glycerol; erythritol; pentaerythritol and the like. Most particularly preferred epoxides within this group are those wherein the acid from which the polyesters are prepared is 3,4-epoxycyclohexanecarboxylic acid; 1-methyl-3,4-epoxycyclohexanecarboxylic acid or 6-methyl-3,4-epoxycyclohexanecarboxylic acid.

(3) Polyesters of 3,4-epoxycyclohexylmethanol and an organic polycarboxylic acid including aliphatic and aromatic polycarboxylic acids. Many of these polyesters are shown in U.S. Patents 2,750,395 and 2,863,881. Polycarboxylic acids other than those named in these patents, from which these polyesters can be prepared include suberic acid, azelaic acid, alkyl substituted succinic acids, itaconic acid, fumaric acid, diglycolic acid and the like; and also hemimellitic acid, trimellitic acid and the like. Most particularly preferred epoxides within this group include those polyesters derived from 3,4-epoxycyclohexylmethanol and 6-methyl-3,4-exoxycyclohexylmethanol.

(4) Bis(3,4-epoxycyclohexylmethyl) ether and related epoxides of the general formula

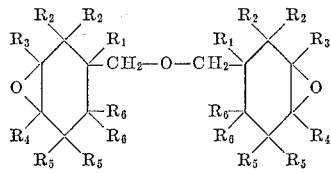

wherein $R_1$, $R_2$, $R_3$, $R_4$, $R_5$, and $R_6$ represent hydrogen or an alkyl group and preferably a lower alkyl group (one to six carbon atoms).

(5) Other cyclohexene oxide type epoxides including, for example, bis(3,4-epoxycyclohexyl) sulfone; vinylcyclohexene dioxide; dipentene dioxide; 3,4 - epoxy-6-methylcyclohexylmethyl-9,10-epoxystearate and the like.

Other monomeric polyepoxides which can be used in the practice of this invention include the glycidyl ethers of alkanediols such as, for example, the diglycidyl ethers of 1,6-hexanediol; 1,5-pentanediol; 1,3-pentanediols; 1,4-butanediol; 1,3-propanediol; 2 - methyl pentane-2,5-diol and the like. Similarly the glycidyl ethers of other polyhydroxy compounds such as diethylene glycol, triethylene glycol, dipropylene glycol, pentaerythritol, glycerol and the like can be used.

Polyepoxides, other than those previously mentioned which also can be used in preparing the novel compositions of this invention include the epoxy esters of polycarboxylic acids such as, for example, the glycidyl esters of phthalic acid, terephthalic acid, succinic acid, adipic acid, oxalic acid, glutaric acid, isophthalic acid, trimetallic acid and the like.

Other monomeric polyepoxides which can be used include the monomeric products obtained by oxidizing dienes; for example the polyepoxide oxidation products obtained from butadiene; pentadienes; hexadienes; alkyl substituted butadiene; pentadiene or hexadiene and the like. Such oxidations can be readily accomplished by known methods, such as described in the U.S. patents mentioned hereinabove, for example.

Other suitable epoxides useful in the practice of this invention include bis(2,3-epoxycyclopentyl) ether; dicyclopentadiene dioxide; divinylbenzene dioxide; vegetable oil epoxides such as, for example, soybean oil epoxide; diglycidyl ether of bisphenol A; glycidyl 2,3-epoxybutyl ether; bis(2,3-epoxy-2-methylpropyl)ether; 1,1 - bis(2,3-epoxy-2-methylpropoxy)ethane and other like epoxides, all well known in the art.

In the following discussion of the remaining essential ingredients used in preparing the novel compositions of this invention, the proportions thereof will be discussed in terms of the number of epoxide groups; that is, the number of groups of the general formula

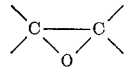

contained in the epoxide or epoxides used. For example, one mole of 3,4-epoxycyclohexylmethyl-3,4-epoxycyclohexanecarboxylic contains two (2) epoxide groups. The number of epoxide groups in any particular compound can be readily determined by the known pyridine hydrochloride analysis, more fully described in U.S. Patent 2,717,885.

Any organic isocyanate of isothiocyanate can be used in the practice of this invention. Suitable isocyanates for use in preparing the novel compositions of this invention are represented by the general formula:

wherein Y represents oxygen or sulfur and wherein R is a substituted or unsubstituted organic hydrocarbon radical such as for example, an alkyl, cycloalkyl, alkenyl, alkynyl, aralkyl, aryl, or alkaryl radical and the like.

Representative compounds include methyl isocyanate, ethyl isocyanate, butyl isocyanate, octylisocyanate, octyldecyl isocyanate, vinyl isocyanate, isopropenylisocyanate. ethynyl isocyanate, benzyl isocyanate, phenyl isocyanate, vinylphenyl isocyanate, tolyl isocyanate, ethyl isothiocyanate, phenyl isothiocyanate and the like.

Preferred isocyanates and isothiocyanates for use in this invention are represented by the general formula:

wherein Y is oxygen or sulfur, R' is a polyvalent substituted or unsubstituted organic hydrocarbon radical and $x$ is an integer of two (2) or more, equal to the valency of the organic radical R'.

Especially preferred polyisocyanates and polyisothiocyanates are those represented by the general formula immediately above wherein $x$ is equal to two (2) and wherein R' is a divalent organic hydrocarbon radical selected from the group consisting of alkylene, substituted alkylene, arylene and substituted arylene radicals.

Representative examples of the preferred and especially preferred polyisocyanates and polyisothiocyanates are PAPI–1 (a polyaryl polyisocyanate as defined in United States Patent No. 2,683,730), tolylene diisocyanate triphenylmethane-4,4',4''-triisocyanate, benzene - 1,3,5 - triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, alpha'-diisothiocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as desired.

The amounts of isocyanate or isothiocyanate used in the novel compositions of this invention are determined by the number of isocyanato or isothiocyanato groups; that is, the number of —N=C=O or —N=C=S groups, respectively; contained in the isocyanate or isothiocyanate used. For example, the number of isocyanato groups in one mole of tolylene diisocyanate is two (2) since it contains two —N=C=O groups. In preparing the novel compositions of this invention from 0.05 to 2.0

(where Y is oxygen or sulfur) groups are used for each epoxide group. In the preferred embodiment of this invention, the compositions contain between about 0.15 and about 0.70 —N=C=Y groups per each epoxide group.

Organic compounds containing an active hydrogen atom are used in the practice of this invention as polymerization initiators or modifiers. Use of these compounds results in many instances in the preparation of compositions capable of fast, room temperature curing to polymerized, cured resins and resinous foams. Compounds containing reactive hydrogen atoms suitable for use in this invention are alcohols (including phenols), carboxylic acids and polyesters or polyethers having terminal hydroxy (—OH) or carboxy (—COOH) groups. While monofunctional materials, such as, for example, butanol, phenol and acetic acid can be used in this invention their low functionality requires the use of large amounts thereof. It is therefore preferable to use polyhydric alcohols, polyhydric phenols, or polycarboxylic acids.

Representative preferred compounds include for example ethylene glycol, diethylene glycol, poly(oxyethylene) glycols, propylene glycol, dipropylene glycol and other poly(oxypropylene) glycols, 1,6-hexanediol, 1,5-pentanediol, 1,2,6-hexanetriol, glycerol, trimethylolpropane, pentaerythritol, inositol, poly(vinyl alcohol), trimethylolphenol, 2,2-bis(hydroxyphenyl)propane, resorcinol, hydroquinone, the various dihydroxy toluenes, polyhydric phenol-formaldehyde condensates, phthalic acid, maleic acid, tetrahydrophthalic acid, hexahydrophthalic acid, succinic acid, alkyl and/or alkenyl substituted succinic acid, glutaric acid, dichloromaleic acid, citroconic acid, itaconic acid, chlorendic acid, chloromaleic acid, sebacic acid, adipic acid, pimelic acid, cyclohexane-1,4-dicarboxylic acid, terephthalic acid, isophthalic acid, azelaic acid, malic acid, and the like.

Other acids and alcohols useful in this invention can be prepared by condensing a polyol with a polycarboxylic acid or polycarboxylic acid anhydride; the proportions of reactants being chosen so as to result in polyesters having terminal hydroxy or carboxy end groups. Preferred acid reactants are the dicarboxylic acids listed immediately above, and their respective anhydrides. Suitable polyols with which these acid reactants can be condensed are, for example, ethylene glycol, diethylene glycol, triethylene glycol, tetraethylene glycol and other poly(oxyethylene) glycols, propylene glycol, di- tri-, and poly-(oxypropylene) glycols, 1,6-hexanediol, 1,5-pentanediol, glycerol, 1,2,6-hexanetriol, trimethylolpropane, pentaerythritol, trimethylolphenol, inositol, poly(vinyl alcohol), resorcinol, hydroquinone, 2,2-bis(hydroxyphenyl)propane and the like.

Mixtures of any of the above-mentioned active-hydrogen atom containing compounds can be used, if desired. The amount of active-hydrogen atom containing compound used in the practice of this invention is determined in accordance with the number of active hydrogen atoms contained therein. For example, one mole of ethylene glycol, or one mole of phthalic acid each contains two (2) active hydrogen atoms. In preparing the novel compositions of this invention the amounts of active-hydrogen atom containing compound added are sufficient to provide from 0.05 to 2.0 active hydrogen atoms for each epoxide group.

Thus, if $i$ is taken to represent the number of isocyanato or isothiocyanato groups per each epoxide group and $h$ is taken to represent the number of active hydrogen atoms per each epoxide group, then $i$ is a number between 0.05 and 2.0, $h$ is a number between 0.05 and 2.0 and $h$ plus $i$ is never greater than 4.0.

Boron trifluoride-amine complexes are used in the practice of this invention as polymerization and curing catalysts for the novel compositions disclosed herein. Suitable boron trifluoride-amine complexes for use in this invention include those wherein the amine component is methylamine, dimethylamine, ethylamine, diethylamine, butylamine, 2-ethylhexylamine, aniline, piperidine, phenylenediamine, toluidine, diphenylamine, diethanolamine, triethanolamine, isopropanolamine, monoethanolamine, and the like.

Boron trifluoride-amine complexes found to be especially effective catalysts and whose use is thus preferred are boron trifluoride-monoethylamine, boron trifluoride-butylamine, boron trifluoride-2-ethylhexylamine, boron trifluoride-piperidine and boron trifluoride-aniline.

Amounts of boron trifluoride-amine complex used in the practice of this invention are expressed as the percent by weight of said complex, based on the total weight of all other essential ingredients, that is, the epoxide, isocyanate and/or isothiocyanate and the active hydrogen atom containing compound used in preparing the novel compositions disclosed herein. It was found, in general, that catalyst concentrations between about 0.01 and 10.0 percent by weight of boron trifluoride were satisfactory, with concentrations between about 0.05 and 5.0 percent by weight being preferred.

When preparing foamable polyurethane compositions in accordance with this invention a foaming agent is also required. Preferred suitable foaming agents are low boiling solvents such as, for exampl, benzene, toluene, acetone, ethyl ether, butyl acetate, methylene dichloride, carbon tetrachloride, hexane, styrene and the like; having a boiling point below about 150° centigrade.

Other suitable foaming agents are those which upon heating will decompose to evolve an inert gas such as carbon dioxide or nitrogen. Foaming agents within this category include, for example, ammonium carbonate, sodium bicarbonate, N,N' - dimethyl - N,N' - dinitrosoterephthalamide, para, para'-oxybis (benzene-sulfonyl hydrazide), azodicarbonamide, benzene sulfonyl hydrazide, diazoamino-benzene, azodiisobutyronitrile, dinitrosopentamethylene tetramine, para-tertiary butyl benzoylazide, and the like.

Another suitable economic foaming agent is a mixture of water and an organic mono-, di-, or polyisocyanate which will react to evolve carbon dioxide. Any one of the isocyanates previously mentioned may be used for this purpose. It is obvious that when an isocyanate is already present in the composition, all that is required is the addition of water to said composition. In such a case, it is also obvious that a small excess of isocyanate may be necessary in order to maintain the above-described critical ratio of from 0.05 to 2.0 isocyanato groups per epoxide group in the composition, after taking into consideration the amount of isocyanate reacted with the added water.

When using a foaming agent in accordance with this invention it is frequently desirable to add a surface-active dispersing agent in order to obtain improved and uniform cell structure. Anionic, cationic and/or nonionic surfactants may be used, as desired. Suitable satisfactory dispersants include, for example, polyoxyethylated vegetable oils (Emulphor Eh–719), sulfonated castor oil (Monopole oil 5276), lignin sulfonates, amine salts of long chain (12 to 16 carbon atoms) alkyl sulfates, poly-(oxyalkylene) glycols such as poly(oxyethylene) and poly(oxypropylene) glycol and/or mixtures thereof, and the like.

In accordance with general practice the nonfoamable or foamable, polymerizable, curable compositions of this invention may be modified, if desired, by the addition of various inert inorganic and/or organic fillers. Suitable inert inorganic materials include, for example, calcium carbonate, silica, asbestos, glass, mica, carbon black, wood flour, antimony oxides, and the like. Organic fillers which can be used include, for example, the various polymers, copolymers and terpolymers of vinyl chloride, vinyl acetate, acrylonitrile, acrylamide, styrene, ethylene, propylene, butadiene, divinyl benzene and the like. Natural organic compounds which have been found advantageous in some of the compositions of this invention include, for example, cellulose and starch.

The use of halogen containing fillers, such as for example, polymers, copolymers, or terpolymers of vinyl chloride alone or together with other halogen containing ingredients, for example chlorendic acid as the polymerization initiator, is especially preferred since the use of such materials imparts good flame resistance to the polymerized, cured and foamed or non-foamed resins obtainable in accordance with the teachings herein.

The novel compositions of this invention are prepared simply by mixing the above specified essential ingredients. In order to prepare homogeneous compositions it is usually preferred to mix the ingredients at a temperature equal to or 5 to 10° centigrade above the temperature required to melt all of the ingredients to be mixed. Preparation of homogeneous compositions is also aided by stirring during or after the addition of the ingredients to be used. The boron trifluoride-amine catalyst can be added at any time prior to polymerizing and curing the composition. When water is to be used as the foaming agent it is obvious that this ingredient is not added until foaming is to be performed. It is also obvious that when a low boiling solvent or a gas-evolving heat decomposable material is used as the foaming agent the temperature at which the ingredients are mixed must be below the temperature at which the said agent boils or decomposes. After the ingredients have been mixed, the composition can then be cooled to a temperature below that at which it will polymerize and cure (and, alternatively, foam); usually at a temperature between −40° and about 20° centigrade; and stored if desired, or it can be used immediately.

Curing (and foaming, when a foamable composition is used) is readily accomplished by maintaining the compositions at temperatures between about 20° and about 200° centigrade. The time required for polymerizing and curing the compositions will vary according to the particular ingredients used and the curing temperature, but generally has been found to be between about 2 or 3 minutes and about 24 hours. The use of aromatic isocyanates such as, for example, tolylene diisocyanate generally results in more rapid curing. Furthermore, the use of the preferred cyclohexene oxide type polyepoxides in preparing the foamable compositions of this invention generally results in a highly exothermic polymerization reaction thereby permitting the curing of the resinous polyurethane foam without requiring any external heating.

In preparing polyurethane resin foams in accordance with this invention it is often found desirable to initially prepare prepolymers for use in the foamable compositions. These prepolymers can be readily prepared by initially partially polymerizing the monomeric epoxide ingredient or partially prereacting the said epoxide monomer; in either instance polymerizing or prereacting only so much of the epoxide monomer as to yield a polymeric reaction product terminated with epoxide

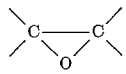

groups. Homopolymerization catalyst such as, for example, mineral acids, Lewis acids, Lewis acid-complexes (boron trifluoride amines, for example), strong bases (sodium hydroxide, for example), and the like, can be used in preparing a partially polymerized epoxide containing terminal epoxide groups. Minor proportions of compounds such as for example polyhydric phenols, polyhydric alcohols, polycarboxylic acids, polyfunctional amines and polyisocyanates are useful in preparing partially reacted polymeric products containing terminal epoxide groups. Use of these prepolymers in preparing the foamable, polymerizable and curable composition of this invention will usually result in composition having a less exothermic polymerization reaction and in polyurethane resin foams having improved cell structure and improved strength properties.

The practice of this invention will be more fully understood by referring to the following non-limiting illustrative examples.

In these examples, the physical properties shown for non-foamed polyurethane resins were determined in accordance with the following ASTM methods:

Heat Distortion Point (degrees centigrade, under a load of 264 pounds per square inch)—ASTM D–648–45T; Izod Impact (foot-pounds per inch, notched sample)-ASTM D–256–47T; Flexural Strength (pounds per square inch) and Flexural Modulus—ASTM D–790–49T.

Barcol hardness values were determined at room temperature (unless otherwise specified) with a Barcol Impressor GYZJ934–1.

The physical properties of polyurethane resin foams were determined on samples cut to required thickness with a band saw and to required size in a die press.

Foam densities (in pounds per cubic foot) were determined by weighing a sample two inches in diameter and one inch thick on an analytical balance. Ultimate compression strengths (pounds per square inch) were determined on a sample of the same dimensions using an Instron tester. Tensile strengths (pounds per square inch), shown only in some of the examples, were also determined on two-inch diameter, one-inch thick discs by gluing aluminum anchor blocks to each of the flat sides of said disc with an epoxy adhesive and then testing on an Instron testing machine.

Stiffness-temperature data shown for the foamed polyurethanes were determined on an Instron tester using a sample about 3 inches by 0.5 inch by 0.125 inch. The data is reported as pounds required to elongate the sample one percent of its original length at the various temperatures indicated and serves as an indication of foam rigidity at those temperatures.

In all examples, the reactant ratios are based on the actual number of epoxide groups present, as determined by analysis of a sample of the epoxide used in accordance with the pyridine hydrochloride test mentioned hereinabove.

Examples 1 through 5 illustrate the preparation of symmetrical and unsymmetrical ethers of substituted and/or unsubstituted 3,4-epoxycyclohexylmethanols. The intermediate 3-cyclohexenylmethanols used in preparing these compounds are readily prepared by condensation of butadiene or one of its homologues (such as isoprene, pentadiene or dimethylbutadiene, for example) with an alpha, beta-unsaturated aldehyde (such as, for example, acrolein, methacrolein or crotonaldehyde) and reduction of the 3-cyclohexene-1-carboxaldehyde thus produced to the corresponding alcohol by known procedures (see, for example, Whitmore "Organic Chemistry" second edition (1951), page 199) using aluminum isopropoxide and isopropanol. The preparation of these alcohols is also described in U.S. Patent 2,750,395. Other steps used in preparing the 3,4-epoxycyclohexylmethyl ether are illustrated in the specific examples below.

EXAMPLE 1.—PREPARATION OF 6-METHYL-3-CYCLOHEXENYLMETHYLCHLORIDE 126 grams of 6-methyl-3-cyclohexenylmethanol were added dropwise over a period of 10 to 15 minutes to 147 grams of 90 percent thionyl chloride contained in a 2-liter 4-necked flask equipped with a stirrer, thermometer, dropping funnel and a variable tube off-distillation head. The flask was maintained at 15° to 20° centigrade during the addition period by using an ice bath. When addition was completed the temperature was slowly raised to 100° centigrade and held at about that temperature for 1.5 hours. The system was then attached to a water aspirator and the pressure lowered to about 30 to 40 millimeters of mercury, absolute, while the temperature was maintained in a range of from about 85° to about 100° centigrade, resulting in a smooth decomposition of the chlorosulfite reaction product and consequent distillation of 92 grams of crude 6-methyl-3-cyclohexenylmethylchloride which was condensed and recovered. The crude liquid product was treated with 30 grams of anhydrous potassium carbonate, filtered and redistilled. The redistillation product was found to be liquid 6-methyl-3-cyclohexenylmethylchloride having a boiling point of 70° to 73° centigrade at 13.5 millimeters of mercury, absolute, and a refractive index, $n_D$ at 30° centigrade, of 1.755. Elemental analysis of the product gave the following results:

|  | Percent by Weight | |
|---|---|---|
|  | Found | Theoretical |
| Carbon | 66.72, 66.70 | 66.4 |
| Hydrogen | 9.12, 9.14 | 9.06 |
| Chlorine | 24.12, 24.24 | 24.5 |

EXAMPLE 2.—PREPARATION OF DI(6-METHYL-3-CYCLOHEXENYLMETHYL)ETHER

Forty-six grams of clean metallic sodium was dissolved in 900 grams of 6-methyl-3-cyclohexenylmethanol contained in a 2-liter flask equipped with a stirrer, reflux condenser and dropping funnel. As the metallic sodium was gradually added, the temperature was maintained between about 80° and 110° centigrade. After all the sodium had dissolved, 289 grams of 6-methyl-3-cyclohexenylmethylchloride were added over a period of one hour, while maintaining the temperature in the same range of between about 80° and about 110° centigrade. During the addition period sodium chloride began to precipitate. The reaction mixture was maintained at a temperature between about 110° and about 120° centigrade for an additional 72 hours, and was then cooled and filtered. The filtrate was fractionally distilled, yielding 240 grams of liquid di(6-methyl-3-cyclohexenylmethyl) ether having a boiling point of 90° to 95° centigrade at 0.25 millimeter of mercury, absolute, and a refractive index, $n_D$ at 30° centigrade, of 1.4841. Elemental analysis gave the following results:

|  | Percent by Weight | |
|---|---|---|
|  | Found | Theoretical |
| Carbon | 82.30, 82.38 | 82.0 |
| Hydrogen | 11.05, 11.14 | 11.18 |

In similar manner one can readily prepare symmetrical or mixed ethers of numerous substituted and unsubstituted 3-cyclohexenylmethanols in turn prepared in accordance with procedures described hereinabove. The preparation of these various unsaturated cycloaliphatic alcohols is also described in U.S. Patent 2,750,395.

EXAMPLE 3.—PREPARATION OF (3-CYCLOHEXENYLMETHYL) (6-METHYL-3-CYCLOHEXENYLMETHYL) ETHER

By following the procedure similar to that shown in Example 2, 259 grams of (3-cyclohexenylmethyl) (6-methyl-3-cyclohexenylmethyl) ether were obtained by dissolving 46 grams of metallic sodium in about 800 grams of 3-cyclohexenylmethylchloride. The (3-cyclohexenylmethyl) (6-methyl-3-cyclohexenylmethyl) ether product had a boiling point of about 107° centigrade at 0.3 millimeter of mercury, absolute; a refractive index, $n_D$ at 30° centigrade, of 1.4858; and on elemental analysis gave the following results:

|  | Percent by Weight | |
|---|---|---|
|  | Found | Theoretical |
| Carbon | 81.67, 82.00 | 81.76 |
| Hydrogen | 11.08, 11.16 | 10.90 |

EXAMPLE 4.—PREPARATION OF DI(6-METHYL-3,4-EPOXYCYCLOHEXYLMETHYL) ETHER 213 grams of di(6-methyl-3-cyclohexenylmethyl) ether were placed in a 2-liter, 4-necked flask equipped with a stirrer, reflux condenser, thermometer and a dropping funnel. The contents of the flask were heated to a temperature of about 50° centigrade and about 600 grams of a 29 percent solution of peracetic acid in ethyl acetate (about 174 grams of peracetic acid) were added over a period of 3.5 hours. The exothermic reaction was controlled by maintaining the temperature of the flask at about 40° centigrade with an ice bath. After all the peracetic acid solution had been added the reaction mixture was maintained at 40° centigrade for an additional 1.5 hours, at which time the mixture was cooled and stored overnight at −10° centigrade. The following day the reaction mixture was azeotropically distilled with ethylbenzene to remove residual acetic acid and then the ethylbenzene was removed by distilling at 95° centigrade and 5 millimeters of mercury absolute. The 254 grams of residue analyzed as 76.8 percent di(6-methyl-3,4-epoxycyclohexylmethyl) ether by determination of epoxy groups. Flash distillation of 45 grams of this residue at 0.15 millimeter of mercury, absolute and 260° centigrade gave 19 grams of liquid di(6-methyl-3,4-epoxycyclohexylmethyl) ether which crystallized on standing to yield a solid product having a melting point range of from 30° to 60° centigrade.

EXAMPLE 5.—PREPARATION OF (3,4-EPOXYCYCLOHEXYLMETHYL) (6-METHYL-3,4-EPOXYCYCLOHEXYLMETHYL) ETHER

In a manner similar to that described in Example 4, 254 grams of (3-cyclohexenylmethylmethyl) (6-methyl-3-cychlohexenylmethyl) ether were treated at 40° centigrade with about 790 grams of a 27.6 percent solution of peracetic acid (about 218 grams of peracetic acid) in ethyl acetate. The product was azeotropically distilled with ethylbenzene to remove residual acetic acid and the ethyl benzene was then removed by distillation at about 80° centigrade and 10 millimeters of mercury, absolute. The 299 grams of residue analyzed as 82 percent (3,4-epoxycyclohexylmethyl) (6-methyl-3,4-epoxycyclohexylmethyl) ether by determination of epoxy groups. Flash distillation of 53 grams of this residue at 232° centigrade and 0.5 millimeter of mercury, absolute, yielded 30 grams of liquid (3,4-epoxycyclohexylmethyl) (6-methyl-3,4-epoxycyclohexylmethyl) ether having a refractive index, $n_D$ at 30° centigrade, of 1.4881 and a viscosity of 152.9 centistokes at 25° centigrade.

EXAMPLES 6 to 20.—RESINS FROM DIEPOXIDES, TOLYLENE DIISOCYANATE, ETHYLENE GLYCOL, AND BORON TRIFLUORIDE-MONOETHYLAMINE COMPLEX

In the following examples the epoxide monomers used were as follows:

| Epoxide: | Chemical Idenification |
|---|---|
| A | Bis(2,3-epoxycyclopentyl) ether. |
| B | Vinylcyclohexene dioxide. |
| C | Dicyclopentadiene dioxide. |
| D | 3,4-epoxycyclohexylmethyl-3,4-epoxycyclohexanecarboxylate. |
| E | 3,4-epoxy-1-methylcyclohexylmethyl-3,4-epoxy-1-methylcyclohexanecarboxylate. |
| F | 1,6-hexanediol bis(3,4-epoxycyclohexanecarboxylate). |
| G | Bis(3,4-epoxycyclohexylmethyl) oxalate. |
| H | 3,4-epoxy-6-methylcyclohexylmethyl-9,10-epoxystearate. |
| I | Divinyl benzene dioxide. |
| J | Dipentene dioxide. |
| K | Bis(3,4-epoxycycloxy) sulfone. |
| L | Glycidyl 2,3-epoxybutyl ether. |
| M | Bis(2,3-epoxy-2-methylpropyl)ether. |
| N | 1,1-bis(2,3-epoxy-2-methylpropoxy) ethane. |
| O | Diglycidyl ether of bis(2,2′-parahydroxyphenyl) propane. |

Mixtures of boron trifluoride-monoethylamine, ethylene glycol and various amounts of the above listed epoxides were prepared. In each instance 0.08 gram of ethylene glycol were used, whereby the ratio of hydroxyl groups (and therefore, of active hydrogen atoms) to epoxide groups in Examples 9, 10 and 12 was 0.25 to 1.0, whereas in each of the other examples the ratio of active hydrogen atoms to epoxide groups was 0.2 to 1.0. Each of the resulting mixtures was heated until it became homogeneous and was then allowed to cool to room temperature. Then 0.19 gram of tolylene diisocyanate was added to each of the homogeneous mixtures thereby providing in all examples 0.2 isocyanate groups per each epoxide group. Gel times were observed, following which the compositions were cured and descriptions of the resins thus produced were recorded. Data is shown in Table I below.

group. To one of these mixtures was added 0.1 gram of boron trifluoride-triethanolamine complex and to the other mixture was added 0.1 gram of boron trifluoride-isopropylamine complex. The mixture containing the said isopropylamine complex formed a gel after 26 hours at 26° centigrade and after further curing for 6 hours at 160° centigrade yielded an amber, slightly brittle resin having a Barcol hardness of 45, the mixture containing the said triethanolamine complex formed a gel after 77 hours at 26° centigrade and after further curing for 6 hours at 160° centigrade yielded an amber, slightly brittle resin having a Barcol hardness of 38.

EXAMPLE 26.—CASTOR OIL AS ACTIVE HYDROGEN COMPOUND

A mixture containing 5.3 grams of 3,4-epoxy-6-methylcyclohexylmethyl - 3,4 - epoxy - 6 - methylcyclohexanecarboxylate, 3.1 grams of castor oil, 0.15 gram of boron Table I

| Example | Epoxide used | Grams of Epoxide | Grams of $BF_3$-MEA[1] | Gel time, hours at temperature, in ° centigrade | Cure cycle, hours at temperature in ° Centigrade | Resin description | Resin Barcol Hardness |
|---|---|---|---|---|---|---|---|
| 6 | A | 0.91 | 0.0174 | 22, 26; 2, 80 | 22, 26; 6, 2, 80; 120; 6, 160 | Amber tough | 42 |
| 7 | B | 0.7 | 0.014 | 2 minutes at 26 | 6, 160 | do | |
| 8 | C | 0.82 | 0.016 | | 15, 120; 6, 160 | Amber brittle | |
| 9 | D | 1.4 | 0.015 | 3 minutes at 26 | 17, 26; 8, 120; 6, 160 | Pale yellow tough | 40 |
| 10 | E | 1.4 | 0.015 | 1 to 17 hours at 26 | Same as Ex. 9 | Yellow tough | 29 |
| 11 | F | 1.83 | 0.031 | 5 minutes at 26 | Same as Ex. 7 | Amber tough | 15 |
| 12 | G | 2.4 | 0.015 | 10 minutes at 26 | Same as Ex. 9 | Pale yellow tough | 40 |
| 13 | H | 2.1 | 0.035 | 22, 26; 6, 80; 1.5, 120 | Same as Ex. 7 | Amber soft | |
| 14 | I | 1.1 | 0.007 | 3, 26 | do | Amber tough | |
| 15 | J | 0.84 | 0.016 | 0.67, 26 | do | Amber brittle | |
| 16 | K | 1.29 | 0.007 | 5 minutes at 120 | 6, 120; 6, 160 | Yellow tough | |
| 17 | L | 0.72 | 0.015 | 21, 26; 1.5, 80 | Same as Ex. 7 | Amber tough | 35 |
| 18 | M | 0.79 | 0.016 | 21, 26; 1.5, 80 | do | do | |
| 19 | N | 1.0 | 0.019 | | do | Brown soft flexible | |
| 20 | O | 1.9 | 0.032 | 24, 26; 6.5, 80 | 24, 26; 6, 80; 2, 120; 6, 160 | Amber tough | 41 |

[1] $BF_3$-MEA is boron trifluoride-monoethylamine complex.

EXAMPLES 21 to 23.—RESINS FROM DIEPOXIDE, TOLYLENE DIISOCYANATE, BORON TRIFLUORIDE - MONOETHYLAMINE AND VARIOUS POLYOLS

Mixtures of 3,4-epoxy-6-methylcyclohexyl-methyl-3,4-epoxy-6-methylcyclohexanecarboxylate, boron trifluoride-monoethylamine and various polyols were prepared. These mixtures were heated until homogeneous and then allowed to cool to room temperature. Tolylene diisocyanate was added and gel timers at room temperature (26° centigrade) were observed. The gels were then further cured for two hours at 120° centigrade and for six hours at 160° centigrade, and resin properties, noted. In each example 0.1 gram of boron trifluoride-monoethylamine catalyst were used, and the amounts of isocyanate and polyol were chosen to provide in each instance, 0.2–0.3 isocyanato groups and 0.2–0.3 active hydrogen atoms per each epoxide group, respectively. Data is shown in Table II.

trifluoride-monoethylamine and 1.6 grams of 2,4-tolylene diisocyanate was prepared in accordance with procedures similar to those described in the previous examples. The resulting mixture therefore contained 0.5 isocyanato groups and 0.1 active hydrogen atoms for each epoxide group; and formed a gel after standing about 4 hours at room temperature. After further curing for 1.5 hours at 120° centigrade there was obtained a yellow tough resin having a Barcol hardness of 15.

EXAMPLES 27–33.—EFFECT OF BORON TRIFLUORIDE MONOETHYLAMINE-CONCENTRATION

Several mixtures were prepared as in the previous examples each containing 7.0 grams of 3,4-epoxy-6-methylcyclohexylmethyl - 3,4 - epoxy-6-methylcyclohexanecarboxylate, 1.8 grams of a poly(oxyethylene) glycol having an average molecular weight of about 400, and various amounts of boron trifluoride-monoethylamine as indicated in the table below. The mixtures were heated at about 50° to about 70° centigrade until homogeneous and then allowed to cool to room temperature. To each Table II

| Example | Polyol Used | Grams of Polyol | Grams of Epoxide | Grams TDI[1] | Gel Time, Minutes at 26° C. | Resin Properties |
|---|---|---|---|---|---|---|
| 21 | Trimethylol Ethane | 0.6 | 8.0 | 1.4 | 10 | Yellow Barcol 49. |
| 22 | 2,4,6-trimethylphenyl allyl ether | 1.1 | 7.6 | 1.3 | 10 | Barcol 46 Amber. |
| 23 | Resorcinol | 0.9 | 8.0 | 1.1 | 1 | Yellow Barcol 50. |

[1] TDI is tolylene diisocyanate.

EXAMPLES 24 AND 25.—EFFECT OF VARIOUS BORON TRIFLUORIDE-AMINE COMPLEXES

Using procedures similar to those described in the previous examples, two mixtures each containing 8.4 grams of 3,4-epoxy-6-methylcyclohexylmethyl-3,4-epoxy-6-methylcyclohexanecarboxylate; 1.8 grams of ethylene glycol and 1.4 grams of tolylene diisocyanato were prepared. These mixtures thus contained 0.4 isocyanato groups and 0.3 active hydrogen atoms for each epoxide of the cooled homogeneous mixtures was added 1.2 grams of 2,4-tolylene diisocyanate, the final compositions thereby each containing 0.1 active hydrogen atoms and 0.3 isocyanato groups per each epoxide groups. All mixtures were allowed to stand for about 18 to 21 hours at room temperature with gelation usually occurring in a period between about 1 and 5 hours. The gels were then further cured for six hours at 80° centigrade, two hours at 120° centigrade and six hours at 160° centigrade, and Barcol hardness values of the resulting resins were measured. Data is shown in Table III below:

Table III

| Examples | Trams of Boron Trifluoride-Monoethylamine Complex | Weight Percent of Complex | Barcol Hardness of Cured Resin |
|---|---|---|---|
| 27 | 0.2 | 2.0 | 40 |
| 28 | 0.25 | 2.5 | 45 |
| 29 | 0.3 | 3.0 | 44 |
| 30 | 0.35 | 3.5 | 44 |
| 31 | 0.4 | 4.0 | 45 |
| 32 | 0.45 | 4.5 | 45 |
| 33 | 0.5 | 5.0 | 42 |

EXAMPLE 34.—PHENYLISOCYANATE AS ISOCYANATE INGREDIENT

A mixture containing 8.0 grams of 3,4-epoxy-6-methylcyclohexylmethyl - 3,4 - epoxy-6-methylcyclohexanecarboxylate, 0.2 gram of ethylene glycol and 0.15 gram of boron trifluoride-monoethylamine complex was prepared; heated at 50° to 70° centigrade until homogeneous and then cooled to room temperature. To this mixture there was added 1.9 grams of phenylisocyanate thereby giving 0.3 isocyanato groups and 0.1 active hydrogen atoms per epoxide group. The final mixture gelled after sitting for two minutes at room temperature. After curing for a total of 18 to 23 hours at 26° centigrade, 8 hours at 120° centigrade and 6 hours at 160° centigrade there was obtained a tough, amber colored resin having a Barcol hardness of 37.

EXAMPLES 35–47.—EFFECT OF VARYING AMOUNTS OF ISOCYANATE AND/OR ACTIVE HYDROGEN ATOMS

A series of compositions were prepared in the same manner described in the previously examples. After curing for the times indicated in Table IV below, there were obtained tough, yellow colored resins, the Barcol hardnesses of which were measured at various temperature levels. Pertinent data is shown in Table IV.

EXAMPLES 48–67

In the following examples polymerizable, curable compositions containing 3,4-epoxy-6-methylcyclohexylmethyl-3,4-epoxy - 6 - methylcyclohexanecarboxylate, ethylene glycol, a mixture of tolylene diisocyanates containing 80 percent by weight of the 2,4-isomer and 20 percent by weight of the 2,6-isomer; and boron trifluoride-monoethylamine complex were prepared in the same manner as in the previous examples. In each instance the amount of the said boron trifluoride complex used was one percent by weight of the total weight of all the other reactants. The ratio of isocyanato groups and active hydrogen atoms per each epoxide group is shown in Table V below. The gel time of each of the compositions was observed, after which each composition was cured at the indicated times and temperatures. In each instance there was obtained a tough, amber colored resin having the properties shown in Table V.

Table V.—Examples 48–67

| Example | Ratio of Reactants [1] | Gel Time, Hours (H) at ° Centigrade Minutes (M) at ° Centigrade | Cure Cycle, Hours at ° Centigrade | Resin Properties | |
|---|---|---|---|---|---|
| | | | | Barcol Hardness | Heat Distortion Temperature, ° C. |
| 48 | [a] 0.1 | 22H, 26; 5H, 50 | 22, 26; 5, 50; 1, 80; 2, 120; 6, 160 | 41 | 75 |
| 49 | 0.1/0.05 | Same as Ex. 48 | Same as Ex. 48 | 35 | 69 |
| 50 | 0.1/0.1 | 4M, 26 | 2, 26; 6, 180 | 44 | 85 |
| 51 | 0.1/0.2 | 9M, 26 | Same as Ex. 50 | 45 | 102 |
| 52 | 0.1/0.3 | 11M, 26 | do | 46 | 122 |
| 53 | [a] 0.2 | Same as Ex. 48 | Same as Ex. 48 | 46 | 77 |
| 54 | 0.2/0.05 | do | do | 46 | 104 |
| 55 | 0.2/0.1 | 4M, 26 | do | 46 | 92 |
| 56 | 0.2/0.3 | 8M, 26 | 4.5, 26; 6, 160 | 50 | 114 |
| 57 | [a] 0.3 | Same as Ex. 48 | Same as Ex. 48 | 46 | 60 |
| 58 | 0.3/0.05 | 4M, 26 | do | 44 | 76 |
| 59 | 0.3/0.1 | 3M, 26 | do | 48 | 135 |
| 60 | 0.4/0.05 | 22H, 26; 4H, 50 | 17, 26; 5, 50; 1, 80; 2, 120; 6, 160 | 47 | 113 |
| 61 | 0.4/0.1 | 4M, 26 | Same as Ex. 60 | 46 | 117 |
| 62 | 0.4/0.2 | 5M, 26 | do | 45 | 149 |
| 63 | 0.4/0.3 | 5M, 26 | do | 45 | 166 |
| 64 | 0.4/0.4 | 8M, 26 | 4, 26; 6, 160 | 52 | 170 |
| 65 | 0.6/0.1 | 8H, 26 | 24, 26; 2.5, 80; 5.5, 120; 6, 160 | 44 | 120 |
| 66 | 0.6/0.3 | 6M, 26 | 4.5, 26; 1, 80; 2, 120; 6, 160 | 49 | 188 |
| 67 | 0.4/0.4 | 7M, 26 | 6 days, 26 | 47 | 149 |

[1] The first number given is the number of isocyanate groups, and the second number is the number of active hydrogen atoms for each epoxide group.
[a] Where only one number is shown, there was no active hydrogen atom containing compound added.

Table IV.—Examples 35–47

| Example | Grams of Epoxide* | Grams of 2,4-TDI [1] | Grams of Glycerol | Grams of Boron Trifluoride-Amine Complex | Ratio of Reactants [2] | Cure Cycle Hours at ° Centigrade | Barcol Hardness of Cured Resins | | |
|---|---|---|---|---|---|---|---|---|---|
| | | | | | | | 26° C. | 120° C. | 160° C. |
| 35 | 1.5 | 0.094 | 0.032 | [a] 0.03 | 0.1/0.1 | 9 min. at 26; 2.5, 120; 6, 160 | 58 | 40 | |
| 36 | 1.5 | 0.094 | 0.064 | [a] 0.03 | 0.1/0.2 | 180 min. at 26; 2.5, 120; 6, 160 | 57 | 32 | |
| 37 | 1.5 | 0.19 | 0.032 | [a] 0.03 | 0.2/0.1 | 18 min. at 26; 2.5, 120; 6, 160 | 59 | 40 | |
| 38 | 1.5 | 0.19 | 0.64 | [a] 0.03 | 0.2/0.2 | 14 min. at 26; 2.5, 120; 6, 160 | 60 | 47 | |
| 39 | 1.5 | 0.28 | 0.032 | [a] 0.03 | 0.3/0.1 | 10 min. at 26; 2.5, 120; 6, 160 | 60 | 52 | |
| 40 | 1.5 | 0.28 | 0.064 | [a] 0.03 | 0.3/0.2 | 12 min. at 26; 2.5, 120; 6, 160 | 62 | 47 | |
| 41 | 8.6 | 1.1 | 0.3 | [b] 0.1 | 0.2/0.2 | 18, 26; 1, 50; 4, 80, 3, 120; 6, 160 | 52 | 40 | 10 |
| 42 | 8.2 | 1.5 | 0.3 | [b] 0.1 | 0.3/0.2 | Same as Ex. 41 | 53 | 34 | 14 |
| 43 | 7.8 | 1.9 | 0.3 | [b] 0.1 | 0.4/0.2 | do | 55 | 40 | 31 |
| 44 | 7.1 | 2.6 | 0.3 | [b] 0.1 | 0.6/0.2 | do | 54 | 45 | 25 |
| 45 | 8.5 | 1.0 | 0.5 | [b] 0.1 | 0.2/0.3 | do | 52 | 40 | 28 |
| 46 | 8.3 | 1.0 | 0.7 | [b] 0.1 | 0.2/0.4 | do | 50 | 20 | 8 |
| 47 | 8.1 | 1.0 | 0.9 | [b] 0.1 | 0.2/0.5 | do | 53 | 30 | 19 |

*The epoxide used was 3,4-epoxy-6-methylcyclohexylmethyl-3,4-epoxy-6-methylcyclohexanecarboxylate.
[1] TDI is tolylene diisocyanate.
[2] The first number given is the number of isocyanate groups per epoxide group; the second number given is the number of active hydrogen atoms per epoxide group.
[a] Grams of boron trifluoride-monoethylamine.
[b] Grams of boron trifluoride-piperidine.

EXAMPLE 68.—HEXANETRIOL AS ACTIVE HYDROGEN ATOM CONTAINING COMPOUND 0.7 gram of 1,2,6-hexanetriol and 0.35 gram of boron trifluoride-monoethylamine complex were mixed until homogeneous. To this homogeneous mixture was added 30.2 grams of bis(3,4-epoxy-6-methylcyclohexylmethyl) adipate and 4.1 grams of tolylene diisocyanate. The resulting composition contained 0.3 isocyanato groups and 0.1 active hydrogen atoms for each epoxide group and formed a gel after 13 minutes at room temperature. After further curing for two hours at 120° centigrade and six hours at 160° centigrade there was obtained a pale amber resin having a Barcol hardness value of 36 and a heat distortion point of 136° centigrade.

EXAMPLE 69.—ISOTHIOCYANATE AS A REACTANT

A polymerizable, curable composition was prepared by mixing boron trifluoride-monoethylamine complex; 3, 4- epoxy - 6 - methylcyclohexylmethyl - 3,4 - epoxy-6-methylcyclohexanecarboxylate; ethylene glycol and phenylisothiocyanate in a manner similar to that described in Example 68. The resulting compositions contained 0.5 isothiocyanato groups and 0.1 active hydrogen atoms for each epoxide group. This composition upon curing yielded an amber, tough resin having a Barcol hardness value of about 45.

EXAMPLE 70.—HEXAMETHYLENE DIISOCYANATE AS REACTANT

A polymerizable, curable composition the same as that in Example 69, with the exception of replacing all of the phenylisothiocyanate with sufficient amounts of hexamethylene diisocyanate to give 0.5 isocyanato groups per each epoxide group, was prepared in a manner similar to that described in Example 68. After curing this composition there was obtained a yellow, tough resin having a Barcol hardness of about 38.

EXAMPLE 71.—EFFECT OF ISOCYANATE ON CURING RATE

In comparison to a mixture containing boron trifluoride-monoethylamine complex, ethylene glycol and 3,4-epoxy - 6 - methylcyclohexylmethyl - 3,4 - epoxy-6-methylcyclohexanecarboxylate which after 4 hours at room temperature remained as a substantially unchanged liquid; a composition containing the same ingredients in the same proportions except for the further addition of tolylene diisocyanate in amounts sufficient to give 0.1 isocyanato groups per epoxide group gelled after about ten minutes at room temperature and after further curing for several hours at room temperature yielded a resin having a Barcol hardness value of about 40.

The following examples illustrate the preparation of foamed resins in accordance with the teachings of this invention. In each of these said examples wherein a water-isocyanate reaction is used for foaming, the amount of isocyanate required to react with the water is not included in the reactant ratios shown. The tolylene diisocyanate used in the following examples was in each instance a mixture containing 80 percent by weight of the 2,4-isomer and 20 percent by weight of the 2,6-isomer.

EXAMPLES 72–82.—RIGID POLYURETHANE FOAMS FROM EPOXIDE, TOLYLENE DIISOCYANATE, HEXANETRIOL, BORON TRIFLUORIDE MONOETHYLAMINE COMPLEX AND WATER

In Examples 72 through 74 various amounts of 1,2,6-hexanetriol were mixed with 0.5 gram of boron trifluoride-monoethylamine complex until homogeneous. To each of these mixtures was added a surfactant, water, a foaming catalyst and an amount of bis(3,4-epoxy-6-methylcyclohexylmethyl) adipate as shown in Table VI below. The last additive to each of these mixtures was tolylene diisocyanate in the amounts shown. Following addition of this last ingredient the final composition was vigorously stirred for one to two minutes with an air stirrer. The resulting stirred mixtures were poured into an aluminum foil mold measuring about 3 inches by 3 inches by 4 inches. The foaming reaction and subsequent gelation of the foam occurred within 4 to 10 minutes after the stirring was started. The resulting foamed resins were cured for 15 minutes at 120° centigrade to cure any tacky edges.

In Examples 75 through 82 foamable compositions containing 3,4-epoxy - 6 - methylcyclohexylmethyl-3,4-epoxy-6-methylcyclohexanecarboxylate in lieu of the bis-(3,4-epoxy-6-methylcyclohexylmethyl) adipate used in Examples 72–74 were prepared by the same procedures. Each of these compositions contained 0.5 gram of boron trifluoride-monoethylamine complex except for Examples 81 and 82 which contained 0.37 and 0.62 gram of said complex, respectively.

Pertinent data for each of Examples 72 to 82 is shown in Table VI below.

*Table VI*

RIGID FOAMS—EXAMPLES 72-82

| Example | Grams of Epoxide | | Grams of Hexanetriol | Grams of TDI [3] | Reactant Ratio [4] | Grams of Water | Foam Properties | |
|---|---|---|---|---|---|---|---|---|
| | X [1] | Y [2] | | | | | Density [5] | Ultimate Compressive Strength [6] |
| 72 | 45.0 | | 1.0 | 11.0 | 1.0/0.1/0.2 | 0.9 | 2.48 | 36.3 |
| 73 | 46.8 | | 1.0 | 10.5 | 1.0/0.1/0.2 | 10.9 | 3.48 | 93.4 |
| 74 | 43.2 | | 1.1 | 11.3 | 1.0/0.1/0.3 | 0.6 | 4.06 | 135 |
| 75 | | 41.5 | 1.4 | 12.7 | 1.0/0.1/0.3 | 0.6 | 2.88 | 68.5 |
| 76 | | 41.5 | 1.4 | 12.7 | 1.0/0.1/0.3 | 0.6 | 3.72 | 113 |
| 77 | | 43.7 | 1.4 | 10.5 | 1.0/0.1/0.2 | 0.6 | 4.23 | 170 |
| 78 | | 45.8 | 1.5 | 8.3 | 1.0/0.1/0.1 | 0.6 | 5.4 | 137 |
| 79 | | 39.6 | 1.3 | 14.7 | 1.0/0.1/0.4 | 0.6 | 2.96 | 80.6 |
| 80 | | 37.9 | 1.2 | 16.4 | 1.0/0.1/0.5 | 0.6 | 2.51 | 56.4 |
| 81 | | 43.7 | 1.4 | 10.5 | 1.0/0.1/0.2 | 0.6 | 4.5 | 215 |
| 82 | | 43.7 | 1.4 | 10.5 | 1.0/0.1/0.2 | 0.6 | 3.42 | 79.7 |

[1] Epoxide X is bis(3,4-epoxy-6-methylcyclohexylmethyl) adipate.
[2] Epoxide Y is 3,4-epoxy-6-methylcyclohexylmethyl-3,4-epoxy-6-methylcyclohexanecarboxylate.
[3] TDI is tolylenediisocyanate.
[4] Ratios shown are the ratio of epoxide groups, active hydrogen atoms and isocyanate groups respectively. The number of isocyanate groups required for foaming reaction with water are not included in this ratio.
[5] In pounds per cubic foot.
[6] In pounds per square inch.

A plot on arithmetic graph paper of ultimate compressive strength versus density for the foams prepared in Examples 72 through 82 showed that the foams of this invention are considerably stronger than the epoxide based foams known to the art, such as those shown in "Epoxy Resins" by Lee and Neville at page 205; for example.

Stiffness-temperature measurements were made on the foam obtained in Example 80, with the following results:

| Temperature, ° centigrade: | Stiffness, pounds per square inch |
|---|---|
| 20 | 1525 |
| 40 | 1425 |
| 60 | 1290 |
| 80 | 1120 |
| 100 | 950 |
| 120 | 820 |
| 140 | 630 |
| 160 | 430 |
| 180 | 235 |
| 200 | 70 |
| 220 | 43 |

This data illustrates the high softening points of the foams of this invention and their high retention of strength even at very high temperatures.

EXAMPLES 83–90.—USE OF POLYETHER-ACID AS ACTIVE HYDROGEN COMPOUND IN PREPARING FOAMS

A polyether-acid product was prepared by mixing 250 grams of a propylene oxide-glycerol adduct having an average molecular weight of 772 with 125 grams of maleic anhydride and heating the resulting mixture for four hours on a steam bath. The polyether-acid product so prepared had a neutralization equivalent of 240.

In order to prepare rigid foams using the polyether-acid described above, various amounts of boron trifluoride-monoethylamine complex were dissolved in 3,4-epoxy - 6 - methylcyclohexylmethyl - 3,4 - epoxy - 6-methylcyclohexanecarboxylate by heating a mixture of these latter two ingredients to a temperature of about 50° centigrade. The mixture of epoxide and complex was then cooled to room temperature and the remaining ingredients; that is, polyether-acid, water, surface-active agent, and, lastly tolylenediisocyanate; were added. The resulting final composition was then vigorously mixed for one to two minutes and poured into an aluminum foil mold of the same dimensions as the mold used in Examples 72–82. The foaming reaction and gelation of each of the compositions occurred within six to eight minutes after mixing was commenced. Each of the resulting foams was then further cured for 15 minutes at 120° centigrade in order to cure any tacky edges.

Pertinent data for Examples 83–90 is shown in Table VII below.

4.5 grams of sebacic acid, heating the mixture for 30 minutes at about 120° centigrade, and then allowing the mixture to react overnight (about 18 hours) at room temperature. The resulting epoxide prepolymer had a viscosity of 74,500 centipoises at 26° centigrade.

The epoxide-sebacic acid adduct prepared as described above was then further mixed with a mixture containing 0.8 gram of ethylene glycol, 0.5 gram of boron trifluoride-monoethylamine complex, 0.6 gram of water, 0.5 gram of a foaming catalyst and 5.6 grams of tolylene diisocyanate. The resulting polymerizable, curable, foamable composition was stirred vigorously for about two minutes and poured into an aluminum foil mold. The foaming reaction and gelation of the composition occurred in about 10 minutes. The resulting foamed resin was further cured for 40 minutes at 120° centigrade and had the following physical properties:

| | |
|---|---|
| Density (pounds per cubic foot) | 7.34 |
| Ultimate Compressive Strength (pounds per square inch) | 174 |
| Stiffness (pounds per square inch) at: | |
| 20° centigrade | 2300 |
| 40° centigrade | 2200 |
| 60° centigrade | 2150 |
| 80° centigrade | 2040 |
| 100° centigrade | 1890 |
| 120° centigrade | 1700 |
| 140° centigrade | 1520 |
| 160° centigrade | 1250 |
| 180° centigrade | 900 |
| 200° centigrade | 400 |
| 220° centigrade | 110 |
| 240° centigrade | 40 |
| 250° centigrade | 30 |

EXAMPLE 92.—FLAME RETARDANT FOAM

A foamable composition based upon 3,4-epoxy-6-methylcyclohexylmethyl - 3,4 - epoxy - 6 - methylcyclohexane-carboxylate and containing about 3.3 percent by weight of antimony oxide ($Sb_2O_3$) and about 60.6 percent by weight of poly(vinyl chloride); each weight percent being based upon the weight of epoxide used; was prepared in a manner similar to that described in the preceding examples. After the foaming reaction and gelation had occurred the resulting foamed resin was cured for about 15 minutes at 120° centigrade.

The foamed resin obtained in this manner had a density of 7.32 pounds per cubic foot, an ultimate compressive strength of 21.0 pounds per square inch, and was self-extinguishing when ignited.

*Table VII*

RIGID FOAMS—EXAMPLES 83–90

| Example | Grams of Epoxide | Grams of TDI [1] | Grams of Polyether-acid [2] | Ratio of Reactants [3] | Grams of Water | Grams of Amine Complex | Grams of Surfactant | Foam Properties | |
|---|---|---|---|---|---|---|---|---|---|
| | | | | | | | | Density [4] | Ultimate Compressive Strength [5] |
| 83 | 32.4 | 13.2 | 15.6 | 1.0/0.3/0.1 | 1.2 | 0.25 | 0.75 | 2.27 | 27.1 |
| 84 | 32.4 | 13.2 | 15.6 | 1.0/0.3/0.1 | 1.2 | 0.25 | 0.25 | 2.93 | 41.4 |
| 85 | 32.4 | 13.2 | 15.6 | 1.0/0.3/0.1 | 1.2 | 0.25 | None | 2.70 | 37.3 |
| 86 | 32.4 | 13.26 | 15.6 | 1.0/0.3/0.1 | 1.2 | 0.25 | 0.5 | 3.88 | 65.4 |
| 87 | 33.2 | 11.2 | 16.8 | 1.0/0.3 | 1.2 | 0.37 | 0.5 | 2.79 | 45.2 |
| 88 | 33.2 | 14.0 | 16.8 | 1.0/0.3 | 1.5 | 0.37 | 0.5 | 1.91 | 24.5 |
| 89 | 33.2 | 16.8 | 16.8 | 1.0/0.3 | 1.8 | 0.37 | 0.5 | 1.45 | 17.2 |
| 90 | 33.2 | 18.7 | 16.8 | 1.0/0.3 | 2.0 | 0.37 | 0.5 | 1.20 | 13.1 |

[1] TDI is tolylene diisocyanate.
[2] Prepared as described above.
[3] The ratio indicates the ratio of epoxide groups to active hydrogen atoms in the polyether acid to isocyanate groups. Ratios indicated do not include the tolylene diisocyanate used for the foaming reaction with water.
[4] Pounds per cubic foot.
[5] Pounds per square inch.
[6] The tolylene diisocyanate of Example 86 also contained 1.0 percent by weight of ethylated cellulose.

EXAMPLE 91.—HIGH SOFTENING FOAM FROM EPOXIDE-ACID PREPOLYMER

An epoxide terminated prepolymer was prepared by mixing 33.2 grams of 3,4-epoxy-6-methylcyclohexylmethyl-3,4-epoxy-6-methylcyclohexanecarboxylate with

EXAMPLES 93–95.—FOAMS FROM VARIOUS CYCLOHEXENE OXIDE TYPE EPOXIDES

Foams were prepared from various cyclohexene oxide type epoxides, using the same procedures as in Examples 72–74 above. In addition to the ingredients and amounts thereof shown in Table VIII below. The following ingredients were used in preparing each of these foams: 0.5 gram of boron trifluoride-monoethylamine complex, 0.6 gram of water, 0.5 gram of surfactant and 0.5 gram of foaming catalyst. In each example the ratio of epoxide groups to isocyanate groups and active hydrogen atoms was 1.0/0.3/0.1, respectively. The ratio of isocyanato groups does not include the amounts of isocyanate required for the isocyanate-water foaming reaction. Pertinent data is shown in Table VIII.

*Table VIII*

| Example | Grams of Epoxide | Grams of TDI [1] | Grams of 1,2,6-hexanetriol | Foam Properties | |
|---|---|---|---|---|---|
| | | | | Density [2] | Ultimate compressive Strength [3] |
| 93 | [a] 44.0 | 10.7 | 1.0 | 3.42 | 81.8 |
| 94 | [b] 43.8 | 10.8 | 1.0 | 4.25 | 157 |
| 95 | [c] 41.2 | 13.0 | 1.4 | 2.58 | 15.6 |

[a] 2-ethyl-1,3-hexanediol bis(3,4-epoxycyclohexane-carboxylate).
[b] Diethylene glycol bis(3,4-epoxy-6-methylcyclo-hexanecarboxylate).
[c] Bis(3,4-epoxycyclohexylmethyl) oxalate.
[1] Tolylene diisocyanate.
[2] Pounds per cubic foot.
[3] Pounds per square inch.

EXAMPLES 96–100.—FOAMS FROM VARIOUS POLYEPOXIDES

Several separate mixtures each containing 0.1 gram of boron trifluoride-monoethylamine complex dissolved in 0.1 gram of ethylene glycol, were prepared. A different epoxide was mixed with each of the separate catalyst mixtures in the amounts indicated in Table IX below. To each of the resulting epoxide containing mixtures was added 0.12 gram of water, 0.1 gram of foaming catalyst, 0.1 gram of surfactant and sufficient amounts of tolylene diisocyanate, not including the isocyanate required for the foaming reaction, to give 0.3 isocyanato groups per each epoxide group. The resulting compositions were stirred vigorously and poured into a paper cup approximately 2.5 inches in diameter and 3.0 inches high. In those instances where the subsequent reaction was not sufficiently exothermic to allow curing at room temperature, the reactants were heated at the temperatures shown in order to accomplish complete curing.

Pertinent data is shown in Table IX.

a member of the group consisting of oxygen and sulfur; (c) an active-hydrogen atom containing organic compound selected from at least one member of the group consisting of alcohols, phenols, carboxylic acids, hydroxy-terminated polyesters, and carboxy-terminated polyesters, the amount of said active-hydrogen containing organic compound being sufficient to provide from 0.05 to 2.0 active hydrogen atoms per each group; and (d) from 0.01 to 10.0 percent by weight, based on the total weight of the above mentioned reactants (a), (b) and (c), of a boron trifluoride-amine complex.

2. The polymerized and cured product obtained by heating the composition of claim 1.

3. A polymerizable, curable, foamable composition of matter stable at a temperature between −40° C. and about 20° C. for producing polyurethane foams which comprises (a) a monomeric oxirane polyepoxide; (b) sufficient amounts of at least one compound selected from the group consisting of organic isocyanates and organic isothiocyanates to provide from 0.05 to 2.0 —N=C=Y groups, where Y is a member of the group consisting of oxygen and sulfur, per each epoxide group in said polyepoxide; (c) sufficient amounts of an active-hydrogen atom containing organic compound selected from at least one of the members of the group consisting of alcohols, phenols, carboxylic acids, hydroxy-terminated polyesters, and carboxy-terminated polyesters to provide from 0.05 to 2.0 active hydrogen atoms per each epoxide group in said epoxide; (d) from 0.01 to 10.0 percent by weight, based on the total weight of the above mentioned ingredients (a), (b), and (c), of a boron trifluoride-amine complex; and (e) a foaming agent.

4. A composition as in claim 3 wherein the foaming agent is a liquid organic solvent having a boiling point below about 150° C.

5. A composition as in claim 3 wherein the foaming agent is a reaction mixture of water and amounts of an organic isocyanate in excess of the amounts specified for ingredient (b) above.

*Table IX.—Examples 96–100*

| Example | Grams of Epoxide | Grams of TDI [1] | Ratio of Reactants [2] | Gel Time, Minutes at ° Centigrade | Further Cure, Hours at ° Centigrade | Foam Properties | | |
|---|---|---|---|---|---|---|---|---|
| | | | | | | Height of Foam, Inches | Density [3] | Description |
| 96 | [a] 7.7 | 3.2 | 1.0/0.1/0.3 | 15, 70 | 15, 120 | 0.75 | 13 | Rigid. |
| 97 | [b] 7.1 | 3.7 | 1.0/0.1/0.3 | 7, 26 | 15, 120 | 5.5 | 5 | Do. |
| 98 | [c] 8.2 | 2.7 | 1.0/0.1/0.3 | 3, 26 | 15, 120 | 1.0 | 13 | Do. |
| 99 | [d] 8.9 | 2.0 | 1.0/0.1/0.3 | 15, 75 | 20, 120 | 0.5 | 14 | Flexible. |
| 100 | [e] 8.7 | 2.2 | 1.0/0.1/0.3 | 15, 80 | 15, 120 | 2.5 | 5 | Rigid. |

[1] TDI=tolylene diisocyanate.
[2] Indicates ratio of epoxide groups to active hydrogen atoms to isocyanate groups. The ratio of isocyanate groups does not include the amount of isocyanate required for the isocyanate-water foaming reaction.
[3] Pounds per cubic foot.
[a] Bis(2,3-epoxycyclopentyl) ether.
[b] Vinylcyclohexene dioxide.
[c] Divinyl benzene dioxide.
[d] Soybean oil epoxide.
[e] Diglycidal ether of Bisphenol A.

What is claimed is:

1. A polymerizable, curable composition of matter stable at a temperature between −40° C. and about 20° C. for producing polyurethanes which comprises: (a) a monomeric oxirane polyepoxide; (b) an organic compound selected from at least one member of the group consisting of organic isocyanates and organic isothiocyanates; in sufficient amounts to provide from 0.05 to 2.0 —N=C=Y groups per each epoxide group where Y is 6. A composition as defined in claim 3 wherein a small amount of a surfactant is also added for enhancing uniformity of cell structure.

7. A polymerizable, curable composition stable at a temperature between —40° C. and about 20° C. for producing polyurethane which comprises: (a) bis(2,3-epoxycyclopentyl) ether; (b) sufficient amounts of tolylene diisocyanate to provide from 0.05 to 2.0 isocyanato groups for each

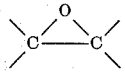

group in said epoxide; (c) sufficient amounts of ethylene glycol to provide from 0.05 to 2.0 active hydrogen atoms for each

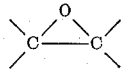

groups in said epoxide, and (d) from 0.05 to 5.0 percent by weight, based on the total weight of the above-named ingredients (a), (b), and (c), of boron trifluoride-monoethylamine complex.

8. A polymerizable, curable composition stable at a temperature between —40° C. and about 20° C. for producing polyurethanes which comprises: (a) vinylcyclohexene dioxides; (b) sufficient amounts of tolylene diisocyanate to provide from 0.05 to 2.0 isocyanato groups for each

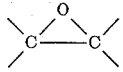

group in said epoxide; (c) sufficient amounts of ethylene glycol to provide from 0.05 to 2.0 active hydrogen atoms for each groups in said epoxide, and (d) from 0.05 to 5.0 percent by weight, based on the total weight of the above-named ingredients (a), (b), and (c), of boron trifluoride-monoethylamine complex.

9. A polymerizable, curable composition stable at a temperature between —40° C. and about 20° C. for producing polyurethanes which comprises: (a) divinyl benzene dioxide; (b) sufficient amounts of tolylene diisocyanate to provide from 0.05 to 2.0 isocyanato groups for each

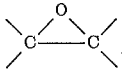

group in said epoxide; (c) sufficient amounts of ethylene glycol to provide from 0.05 to 2.0 active hydrogen atoms for each

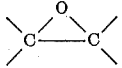

group in said epoxide, and (d) from 0.05 to 5.0 percent by weight, based on the total weight of the above-named ingredients (a), (b), and (c), of boron trifluoride-monoethylamine complex.

10. A polymerizable, curable composition stable at a temperature between —40° C. and about 20° C. for producing polyurethanes which comprises: (a) 3,4-epoxy-6-methylcyclohexylmethyl-3,4 - epoxy-6-methylcycloehxanecarboxylate; (b) sufficient amounts of tolylene diisocyanate to provide from 0.05 to 2.0 isocyanato groups for each

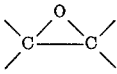

group in said epoxide; (c) sufficient amounts of ethylene glycol to provide from 0.05 to 2.0 active hydrogen atoms for each

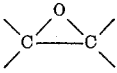

group in said epoxide; and (d) from 0.05 to 5.0 percent by weight, based on the total weight of the above-named ingredients (a), (b), and (c), of boron trifluoride-monoethylamine complex.

11. A polymerizable curable composition of matter stable at a temperature between —40° C. and about 20° C. for producing polyurethanes which comprises: (a) 3,4-epoxy-6-methylcyclohexylmethyl - 3,4 - epoxy-6-methylcyclohexanecarboxylate; (b) sufficient amounts of tolylene diisocyanate to provide from 0.05 to 2.0 isocyanato groups for each

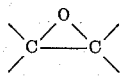

group in said epoxide; (c) sufficient amounts of 2,4,6-trimethylolphenyl allyl ether to provide from 0.05 to 2.0 active hydrogen atoms for each

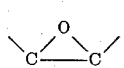

group in said epoxide and (d) from 0.05 to 5.0 percent by weight, based on the total weight of the above-named ingredients (a), (b), and (c), of boron trifluoride-monoethylamine complex.

12. A polymerizable, curable composition of matter stable at a temperature between —40° C. and about 20° C. for producing polyurethanes which comprises: (a) 3,4-epoxy - 6 - methylcyclohexylmethyl-3,4-epoxy-6-methylcyclohexanecarboxylate; (b) sufficient amounts of tolylene diisocyanate to provide from 0.05 to 2.0 isocyanato groups for each

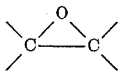

group in said epoxide; (c) sufficient amounts of poly(oxyethylene) glycol to provide from 0.05 to 2.0 active hydrogen atoms for each

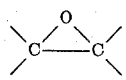

group in said epoxide; and (d) from 0.05 to 5.0 percent by weight, based on the total weight of the above-named ingredients (a), (b), and (c), of boron trifluoride-monoethylamine complex.

13. A polymerizable, curable composition of matter stable at a temperature between —40° C. and about 20° C. for producing polyurethanes which comprises: (a) 3,4-epoxy-6-methylcyclohexylmethyl - 3,4 - epoxy-6-methylcyclohexanecarboxylate; (b) sufficient amounts of tolylene diisocyanate to provide from 0.05 to 2.0 isocyanato groups for each

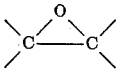

group in said epoxide; (c) sufficient amounts of glycerol to provide 0.05 to 2.0 active hydrogen atoms for each

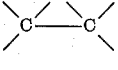

group in said epoxide; and (d) from 0.05 to 5.0 percent by weight, based on the total weight of the above-named ingredients (a), (b), and (c), of boron trifluoride-monoethylamine complex.

14. A polymerizable, curable composition stable at a temperature between —40° C. and about 20° C. for producing polyurethanes which comprises: (a) 3,4-epoxy-6-methylcyclohexylmethyl - 3,4 - epoxy - 6 - methylcyclohexanecarboxylate; (b) sufficient amounts of tolylene diisocyanate to provide from 0.05 to 2.0 isocyanato groups for each

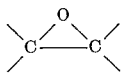

group in said epoxide; (c) sufficient amounts of ethylene glycol to provide from 0.05 to 2.0 active hydrogen atoms for each

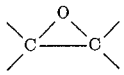

group in said epoxide; and (d) from 0.05 to 5.0 percent by weight, based on the total weight of the above-named reactants (a), (b), and (c), of boron trifluoride-piperidine complex.

15. A polymerizable foamable and curable composition of matter stable at a temperature between —40° C. and about 20° C. for producing polyurethane foams which comprises: (a) 3,4-epoxy-6-methylcyclohexylmethyl-3,4-epoxy - 6 - methylcyclohexanecarboxylate; (b) sufficient amounts of tolylene diisocyanate to provide from 0.05 to 2.0 isocyanato groups for each

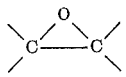

group in said epoxide; (c) sufficient amounts of 1,2,6-hexanetriol to provide from 0.05 to 2.0 active hydrogen atoms per each

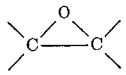

group in said epoxide, (d) from 0.05 to 5.0 percent by weight, based on the total weight of the above-named ingredients (a), (b), and (c), of boron trifluoridemonoethylamine complex; and (e) as a foaming agent, a reaction mixture of water and amounts of tolylene diisocyanate in excess of the amounts specified for (d) above.

16. A polymerizable foamable and curable composition of matter stable at a temperature between —40° C. and about 20° C. for producing polyurethane foams which comprises: (a) 3,4-epoxy - 6 - methylcyclohexylmethyl-3,4-epoxy-6-methylcyclohexanecarboxylate; (b) sufficient amounts of tolylenediisocyanate to provide from 0.05 to 2.0 isocyanato groups for each

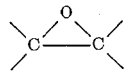

group in said epoxide; (c) sufficient amounts of a polyether-acid reaction product of a propylene oxide-glycerol adduct and maleic anhydride to provide from 0.05 to 2.0 active hydrogen atoms for each

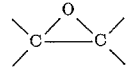

group in said 3,4-epoxy-6-methylcyclohexylmethyl-3,4-epoxy-6-methylcyclohexanecarboxylate; (d) from 0.05 to 5.0 percent by weight, based on the total weight of the above mentioned ingredients (a), (b), and (c), of boron trifluoride-monoethylamine complex; and (e) as a foaming agent, a reaction mixture of water and amounts of tolylene diisocyanate in excess of the amounts specified for (d) above.

17. A polymerizable, foamable and curable composition of matter stable at a temperature between —40° C. and about 20° C. for producing polurethane foams which comprises: (a) an epoxide-terminated prepolymer reaction product of 3,4-epoxy-6-methylcyclohexylmethyl-3,4-epoxy-6-methylcyclohexanecarboxylate and small amounts of sebacic acid; (b) sufficient amounts of tolylene diisocyanate to provide from 0.05 to 2.0 isocyanato groups for each

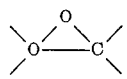

group in said epoxide-terminated prepolymer; (c) sufficient amounts of ethylene glycol to provide from 0.05 to 2.0 active hydrogen atoms for each

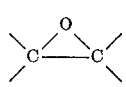

group in said epoxide-terminal prepolymer; (d) from 0.05 to 5.0 percent by weight, based on the total weight of the above-named ingredients (a), (b), and (c), of boron trifluoride-monoethylamine complex; and (e) as a foaming agent, a reaction mixture of water and amounts of tolylene diisocyanate in excess of the amounts specified for (d) above.

References Cited by the Examiner
UNITED STATES PATENTS

| | | | |
|---|---|---|---|
| 2,633,458 | 3/1953 | Shokal | 260—77.5 |
| 2,740,743 | 4/1956 | Pace | 260—2.5 |
| 2,906,717 | 9/1959 | Sekmakas | 260—2.5 |
| 2,890,195 | 6/1959 | Phillips et al. | 260—78.4 |
| 2,890,197 | 6/1959 | Phillips | 260—78.4 |
| 2,907,745 | 10/1959 | Greenlee | 260—2.5 |
| 2,917,491 | 12/1959 | Phillips et al. | 260—78.4 |
| 2,932,626 | 4/1960 | Phillips et al. | 260—78.4 |
| 2,962,183 | 11/1960 | Rill et al. | 260—2.5 |
| 2,984,679 | 5/1961 | Ehrlich et al. | 260—2.5 |

OTHER REFERENCES

Langes' Handbook of Chemistry, 9th. Ed., 1956, page 351, published by Handbook Publishers, Inc., Sandusky, Ohio.

LEON J. BERCOVITZ, *Primary Examiner.*

DANIEL ARNOLD, *Examiner.*